(12) United States Patent
Feldman et al.

(10) Patent No.: US 11,276,072 B2
(45) Date of Patent: Mar. 15, 2022

(54) METHODS AND SYSTEMS FOR DETERMINING A QUANTITY AND A SIZE DISTRIBUTION OF PRODUCTS

(71) Applicant: CaaStle, Inc., New York, NY (US)

(72) Inventors: Shannah Rose Feldman, New York, NY (US); Jessica Kahan Dvorett, New York, NY (US)

(73) Assignee: CaaStle, Inc., New York, NY (US)

( * ) Notice: Subject to any disclaimer, the term of this patent is extended or adjusted under 35 U.S.C. 154(b) by 0 days.

(21) Appl. No.: 16/857,905

(22) Filed: Apr. 24, 2020

(65) Prior Publication Data

US 2021/0334828 A1    Oct. 28, 2021

(51) Int. Cl.
*G06Q 30/02* (2012.01)
*G06Q 30/06* (2012.01)

(52) U.S. Cl.
CPC ..... *G06Q 30/0202* (2013.01); *G06Q 30/0645* (2013.01)

(58) Field of Classification Search
None
See application file for complete search history.

(56) References Cited

U.S. PATENT DOCUMENTS

| | | | | |
|---|---|---|---|---|
| 6,032,125 A * | 2/2000 | Ando | ................. | G06Q 10/087 705/28 |
| 8,065,203 B1 * | 11/2011 | Chien | ............. | G06Q 10/06315 705/28 |
| 2009/0106085 A1 * | 4/2009 | Raimbeault | ........ | G06Q 30/0631 705/14.44 |
| 2009/0112648 A1 * | 4/2009 | Lee | ......................... | G06Q 30/02 705/7.32 |
| 2012/0150764 A1 * | 6/2012 | Sadegh | ................ | G06Q 10/067 705/348 |
| 2014/0039979 A1 * | 2/2014 | Zhang | ................ | G06Q 30/0202 705/7.31 |
| 2014/0351008 A1 * | 11/2014 | Oyamatsu | .......... | G06Q 30/0202 705/7.29 |
| 2016/0292765 A1 * | 10/2016 | Jin | ..................... | G06Q 30/0601 |
| 2018/0218322 A1 * | 8/2018 | Bhargava | ............ | G06Q 10/0875 |
| 2019/0080246 A1 * | 3/2019 | Sun | ..................... | G06Q 30/0242 |
| 2019/0108458 A1 * | 4/2019 | Yu | .......................... | G06N 20/00 |
| 2020/0302506 A1 * | 9/2020 | Parker | .................... | G06N 20/00 |

\* cited by examiner

*Primary Examiner* — Patricia H Munson
*Assistant Examiner* — Marjorie Pujols-Cruz
(74) *Attorney, Agent, or Firm* — Bookoff McAndrews, PLLC

(57) ABSTRACT

A computer-implemented method may include obtaining article information associated with the one or more articles; obtaining historical transactional data associated with purchasing the one or more articles; obtaining, via the one or more processors, article preference data associated with purchasing the one or more articles; determining, via the one or more processors, one or more assumptions based on the article preference data; determining, via the one or more processors, the quantity associated with purchasing the one or more articles based on the article information and the one or more assumptions; determining, via the one or more processors, the size distribution associated with purchasing the one or more articles based on the determined quantity, the historical transactional data, and the one or more assumptions; and transmitting, to a purchaser, a notification indicating the quantity and the size distribution associated with purchasing the one or more articles.

20 Claims, 7 Drawing Sheets

400

402

| SIZE | 0 | 2 | 4 | 6 | 8 | 10 | 12 | 14 | 16 | 18W | 20W | 22W | 24W | 26W | 28W | 30W | 32W | TTL |
|---|---|---|---|---|---|---|---|---|---|---|---|---|---|---|---|---|---|---|
| UNITS | 1 | 1 | 3 | 3 | 3 | 7 | 12 | 12 | 7 | 14 | 9 | 7 | 7 | 3 | 3 | 1 | 1 | 130 |
| % TO TTL | 1% | 1% | 2% | 2% | 3% | 5% | 9% | 9% | 5% | 11% | 7% | 5% | 5% | 2% | 2% | 1% | 1% | 100% |

404

| SIZE | 6 | 8 | 10 | 12 | 14 | 16 | 18W | 20W | 22W | 24W | TTL |
|---|---|---|---|---|---|---|---|---|---|---|---|
| UNITS | 3 | 3 | 7 | 14 | 13 | 8 | 17 | 11 | 7 | 7 | 130 |
| % TO TTL | 2% | 3% | 5% | 11% | 10% | 6% | 13% | 8% | 5% | 5% | 100% |

406

| SIZE | 4 | 6 | 8 | 10 | 12 | 14 | 16 | 18W | 20W | 22W | 24W | TTL |
|---|---|---|---|---|---|---|---|---|---|---|---|---|
| UNITS | 3 | 3 | 3 | 7 | 13 | 13 | 8 | 17 | 11 | 7 | 7 | 130 |
| % TO TTL | 2% | 2% | 3% | 5% | 10% | 10% | 6% | 13% | 8% | 5% | 5% | 100% |

408

| SIZE | 0 | 2 | 4 | 6 | 8 | 10 | 12 | 14 | 16 | 18W | 20W | 22W | 24W | 26W | TTL |
|---|---|---|---|---|---|---|---|---|---|---|---|---|---|---|---|
| UNITS | 1 | 1 | 3 | 3 | 3 | 7 | 13 | 13 | 7 | 17 | 11 | 7 | 7 | 3 | 130 |
| % TO TTL | 1% | 1% | 2% | 2% | 3% | 5% | 10% | 10% | 5% | 13% | 8% | 5% | 5% | 2% | 100% |

*FIG. 4*

METHODS AND SYSTEMS FOR DETERMINING A QUANTITY AND A SIZE DISTRIBUTION OF PRODUCTS

TECHNICAL FIELD

Various embodiments of the present disclosure relate generally to providing information to a purchaser regarding purchasing one or more articles, and, more particularly, to providing the purchaser with a quantity and a size distribution associated with purchasing one or more articles.

BACKGROUND

Fashion and apparel style management may pose several challenges for apparel rental subscription services. For example, one such challenge may be that traditional processes of purchasing decisions for apparel rental subscription services may be error prone and labor intensive. Existing solutions may not be practical because existing tools or applications for apparel rental subscription services may be built on a store-based model. Such store-based models for purchasing decisions may be based on the number of stores that one or more articles will be sold in, and an anticipated average number that each store can sell in a week or during a predetermined period of time (e.g., a lifetime of an article or article category). In this situation, the lifetime of an article or article category may be considered to be between 12 and 26 weeks, depending on the article category. These existing solutions may not apply to apparel rental services, such as subscription-based services and/or clothing-as-a-service (CaaS), because purchasing decisions for a rental service are not based on how much inventory will be sold, but on other factors. Additionally, rental inventory may last far longer than inventory sold in stores, because an article that a customer wanted to rent a year ago may still be relevant today.

A further challenge for rental services may be that many brands or clothing merchants for rental services may have different dates by which purchasing information (e.g., purchasing quantity) is due. Thus, it may be difficult to have a full picture of what a seasonal buy (e.g., what the purchaser is purchasing) looks like across one or more attributes (e.g., what percentage of article categories are dresses, tops, or pants) until a final article category has been purchased, since purchases may be done on a rolling basis. In traditional retail, this challenge may not occur since all styles in a given month or season may be determined at the same time. Within traditional retail, purchasing quantities and size distributions may be determined by large teams ranging from purchasing, to merchandising, to planning, or to allocation. For an entity providing apparel rental subscription services without any physical stores (or in addition to physical stores), it may be difficult to allocate the same resources as traditional retailers (e.g., having multiple employees to determine the purchasing quantities and size distributions).

Another difference between rental services and traditional retail may be that when it comes to assortment planning, rental services may endeavor to create an optimal "portfolio" of articles that will appeal to a broad customer base. In traditional retail, however, the focus may be on how well a given article category is likely to sell within given cost and pricing constraints. As an entity providing apparel rental subscription services without any physical stores (or for subscription services provided in addition to physical stores), it may be difficult to gain more revenue for an article that has a relatively higher cost (e.g., since revenue is generated from a monthly subscription fee and is not tied to the individual article that a given member is renting). Thus, the objective of the apparel rental and/or subscription services may be to purchase an assortment of articles that is appealing to a broad customer base of the apparel rental and/or subscription services while trying to meet financial and assortment targets of the entity.

The present disclosure is directed to overcoming one or more of these above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, methods and systems are disclosed for determining a quantity and a size distribution associated with purchasing one or more articles. The methods and systems disclosed herein may enable a single purchaser to independently assess the quantity and size distribution associated with purchasing the one or more articles. The methods and systems disclosed herein may enable an entity providing apparel rental subscription services to purchase an assortment of articles that is appealing to a broad customer base while meeting all of the financial and assortment targets of the entity. The methods and systems disclosed herein may ensure that when a last piece of article in the assortment is purchased, seasonal inventory plans may be achieved. The methods and systems disclosed herein may provide flexibility for changes that quickly and efficiently adjust one or more assumptions based on shifts in business trends, financial plans, or the customer base. One or more assumptions may be adjusted automatically and applied to new article categories that are purchasers without informing or interacting with one or more purchasers. It may be beneficial to have alignment with demand (e.g., how much a purchaser may purchase) and supply (e.g., popularity of an article among customers or users), at both the overall article category level (e.g., total quantity among different article categories) and size distribution. The method may help avoid the situations with too much or too little inventory of articles. Too much inventory of articles may indicate money may have been spent on unnecessary articles, and too little inventory may mean customers or users may not be able to rent the articles they want.

In an aspect, a computer-implemented method for determining a quantity and a size distribution associated with purchasing one or more articles may include: obtaining, via one or more processors, article information associated with the one or more articles, wherein the article information comprises information of one or more attributes associated with the one or more articles, wherein the one or more attributes include at least one of an average unit cost, a type of customer, a level of conviction, or an article category; obtaining, via the one or more processors, historical transactional data associated with purchasing the one or more articles, wherein the historical transactional data comprises at least a historical size distribution associated with purchasing the one or more articles; obtaining, via the one or more processors, article preference data associated with purchasing the one or more articles, wherein the article preference data comprises at least one of season impact data or customer identification data; determining, via the one or more processors, one or more assumptions based on the article preference data; determining, via the one or more processors, the quantity associated with purchasing the one or more articles based on the article information and the one or more assumptions; determining, via the one or more processors, the size distribution associated with purchasing the one or more articles based on the determined quantity, the historical transactional data, and the one or more assumptions; and transmitting, to a purchaser, a notification indicating the quantity and the size distribution associated with purchasing the one or more articles.

In another aspect, a computer system for determining a quantity and a size distribution associated with purchasing one or more articles may include a memory storing instructions; and one or more processors configured to execute the instructions to perform operations. The operations may include obtaining, via one or more processors, article information associated with the one or more articles, wherein the article information comprises information of one or more attributes associated with the one or more articles, wherein the one or more attributes include at least one of an average unit cost, a type of customer, a level of conviction, or an article category; obtaining, via the one or more processors, historical transactional data associated with purchasing the one or more articles, wherein the historical transactional data comprises at least a historical size distribution associated with purchasing the one or more articles; obtaining, via the one or more processors, article preference data associated with purchasing the one or more articles, wherein the article preference data comprises at least one of season impact data or customer identification data; determining, via the one or more processors, one or more assumptions based on the article preference data; determining, via the one or more processors, the quantity associated with purchasing the one or more articles based on the article information and the one or more assumptions; determining, via the one or more processors, the size distribution associated with purchasing the one or more articles based on the determined quantity, the historical transactional data, and the one or more assumptions; and transmitting, to a purchaser, a notification indicating the quantity and the size distribution associated with purchasing the one or more articles.

In yet another aspect, a non-transitory computer readable medium for use on a computer system containing computer-executable programming instructions for performing a method of determining a quantity and a size distribution associated with purchasing one or more articles. The method may include obtaining, via one or more processors, article information associated with the one or more articles, wherein the article information comprises information of one or more attributes associated with the one or more articles, wherein the one or more attributes include at least one of an average unit cost, a type of customer, a level of conviction, or an article category; obtaining, via the one or more processors, historical transactional data associated with purchasing the one or more articles, wherein the historical transactional data comprises at least a historical size distribution associated with purchasing the one or more articles; obtaining, via the one or more processors, article preference data associated with purchasing the one or more articles, wherein the article preference data comprises at least one of season impact data or customer identification data; determining, via the one or more processors, one or more assumptions based on the article preference data; determining, via the one or more processors, the quantity associated with purchasing the one or more articles based on the article information and the one or more assumptions; determining, via the one or more processors, the size distribution associated with purchasing the one or more articles based on the determined quantity, the historical transactional data, and the one or more assumptions; and transmitting, to a purchaser, a notification indicating the quantity and the size distribution associated with purchasing the one or more articles.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 4 depicts an exemplary user interface presented on an employee device for a purchaser showing a size distribution associated with purchasing one or more articles, according to one or more embodiments of the present disclosure.

DETAILED DESCRIPTION OF EMBODIMENTS

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus.

Relative terms, such as, "substantially" and "generally," are used to indicate a possible variation of ±10% of a stated or understood value.

In the following description, embodiments will be described with reference to the accompanying drawings. As will be discussed in more detail below, in various embodiments, data such as article information, historical transactional data, one or more assumptions, or article preference data may be used to generate a quantity and a size distribution associated with purchasing one or more articles.

The method described herein may determine article-category-level quantity to reduce the amount of time a purchaser spends on determining such quantity; allow the seasonal assortment to achieve topline quantity and average unit cost targets, as well as assortment targets (e.g., overall seasonal targets set by the purchasers); enable article-category-level quantity to be roughly in line with units derived from the existing or traditional processes. The method described herein may enable a purchaser or entity providing the apparel rental subscription services to build a spreadsheet-based or other database-based tool to calculate a quantity or size distribution associated with purchasing one or more articles based on no more than five attributes. One or more factors may be used to determine which attributes may be used and how values of the attributes can be changed.

Figure 1:
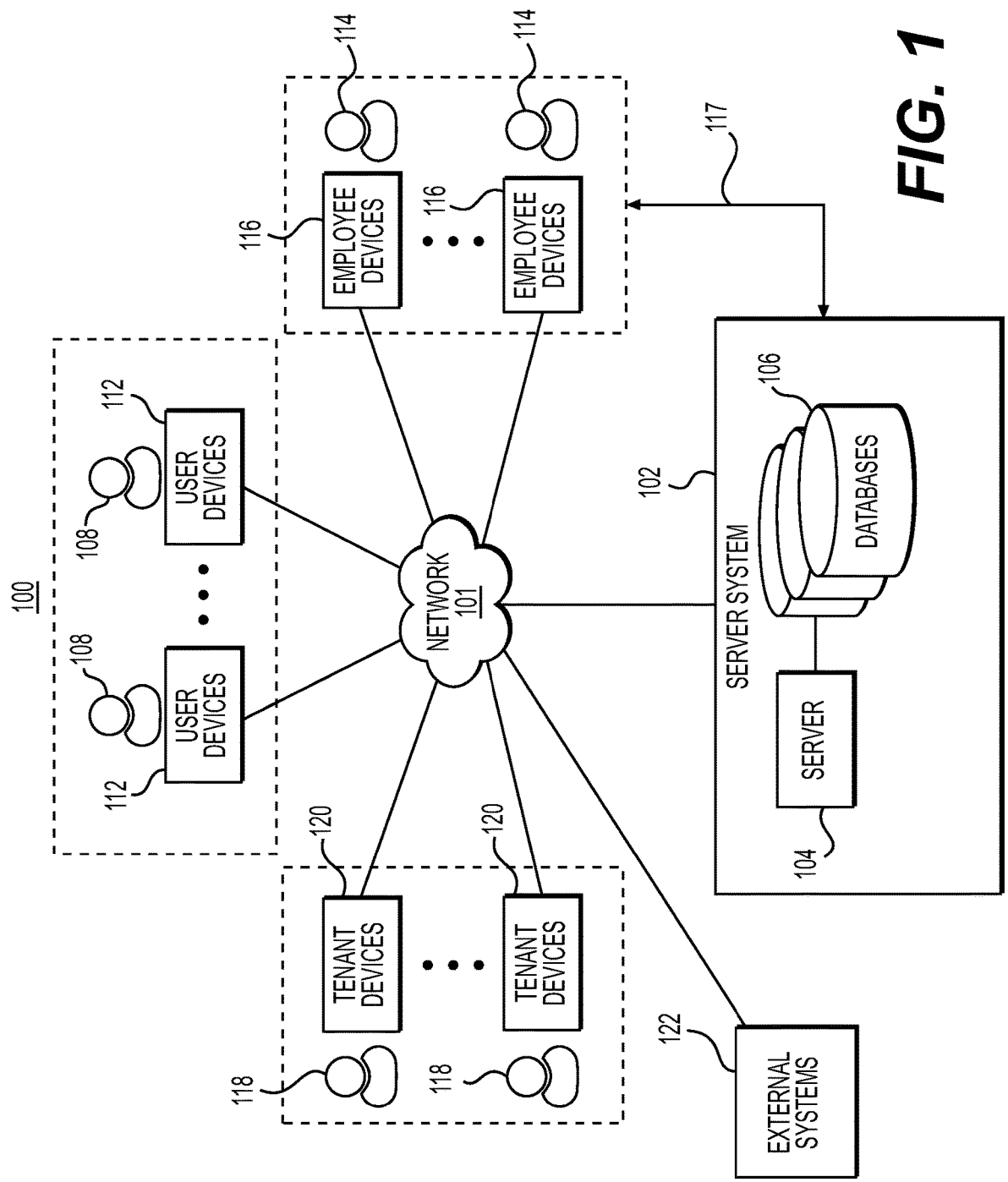
FIG. 1 depicts an exemplary environment in which methods, systems, and other aspects of the present disclosure may be implemented.

FIG. 1 shows an exemplary environment 100, according to one or more embodiments of the present disclosure. As shown, the exemplary environment 100 may include one or more networks 101 that interconnect a server system 102, user devices 112, employee devices 116 (e.g., purchaser device), tenant devices 120, and external systems 122. The one or more networks 101 may be, for example, one or more of a cellular network, a public land mobile network, a local area network, a wide area network, a metropolitan area network, a telephone network, a private network, an ad hoc network, an intranet, the Internet, a fiber optic based network, a cloud computing network, etc. User devices 112 may be accessed by users or customers 108, employee devices 116 may be accessed by authorized employees 114 (e.g., a purchaser), and tenant devices 120 may be accessed by employees of tenant entities 118. In some implementations, employee devices 116 may be used to perform the functions of the tenant devices 120 and/or the user devices 112. Server system 102 may comprise one or more servers 104 and one or more databases 106, which may be configured to store and/or process a plurality of data, microservices, and service components, and/or associated functions thereof. In some embodiments, the server system 102 may comprise an algorithm module. The one or more servers 104 may comprise the algorithm module in some embodiments. The algorithm module may comprise a machine learning module including one or more neural networks. In some embodiments, the one or more neural networks may include deep convolutional neural networks (DCNN) and/or region based convolutional neural networks (R-CNN). R-CNNs may include one or more convolutional neural network models designed for object detection within an image. DCNNs may be configured to analyze visual imagery, for example, for analyzing, classifying, and identifying one or more products within an image depicting the one or more products. In some embodiments, the one or more neural networks may comprise one or more image segmentation based neural networks and one or more image classification based neural networks.

Users or customers 108 may access the server system 102 through the one or more networks 101 using user devices 112. Each device among the user devices 112 may be any type of computing device (e.g., personal computing device, mobile computing devices, etc.) which allows users or customers 108 to display a web browser or a web based application for accessing the server system 102 through the network 101. The user devices 112 may, for example, be configured to display a web browser, a web based application, or any other user interface (e.g., one or more mobile applications) for allowing users or customers 108 to exchange information with other device(s) or system(s) in the environment 100 over the one or more networks 101. For example, a device among the user devices 110 may load an application with a graphical user interface (GUI), and the application may display on the GUI one or more apparel recommendations for closeting by the user. Users or customers 108 accessing user devices 112 may be, for example, users and/or potential users of apparel rental subscription services and/or apparel made available for subscription based distribution via electronic transactions and physical shipment. Additionally, or alternatively, users or customers 108 may access user devices 112 to, for example, manage one or more user accounts, view catalogs, configure one or more user profiles, engage in customer service communications, make purchase orders, track shipments, generate shipments, monitor order fulfillment processes, initiate or process returns, order apparel for purchase, provide feedback, refer other users, navigate through various features such as size advisor, perform personalized discovery, and/or make recommendations.

Employee devices 116 may be configured to be accessed by one or more employees 114, including, for example, purchasers, customer service employees, marketer employees, warehouse employees, analytics employees, or any other employees who are authorized and/or authenticated to perform tasks, operations, and/or transactions associated with the server system 102, and/or the external systems 122. In one embodiment, employee devices 116 are owned and operated by the same entity or at least an affiliate of the entity operating the apparel rental subscription services or e-commerce (e.g., CaaS) business hosted on server systems 102. Each device among the employee devices 116 may be any type of computing device (e.g., personal computing devices, mobile computing devices, etc.). The employee devices 116 may allow employees 114 to display a web browser or an application for accessing the server system 102 and/or the external systems 122, through the one or more networks 101. For example, a device among the one or more of the employee devices 116 may load an application with a GUI, and the application may display on the GUI one or more warehouse operations associated with providing CaaS to users or customers 108. In some implementations, the employee devices 116 may communicate directly with the server system 102 via communications link 117 bypassing public networks 101. Additionally, or alternatively, the employee devices 116 may communicate with the server system 102 via network 101 (e.g., access by web browsers or web based applications).

Tenant devices 120 may be configured to be accessed by one or more tenants 118. Each device among the tenant devices 120 may be any type of computing device (e.g., personal computing device, mobile computing devices, etc.). As used herein, each tenant, among one or more tenants 118, may refer to an entity or merchant that allocates and/or supplies one or more specific collections of apparel for the CaaS inventory. For example, each of the one or more tenants 118 may be a retailer, a designer, a manufacturer, a merchandiser, or a brand owner entity that supplies one or more collections of wearable items to the CaaS inventory managed and/or accessed by the server system 102. Tenants 118 may use one or more electronic tenant interfaces (e.g., a catalog content management system associated with each tenant) to provide the server system 102 with wearable item data (e.g., apparel information) that describe apparel or wearable items made available for electronic transactions on server system 102. For example, one or more catalogs for each of the one or more tenants 118 may be generated and/or updated at the server system 102 dynamically and/or periodically. Tenant devices 120 may serve as access terminals for the tenants 118, for communicating with the electronic tenant interfaces and/or other subsystems hosted at the server system 102. The tenant devices 120 may, for example, be configured to display a web browser, an application, or any other user interface for allowing tenants 118 to load the electronic tenant interfaces and/or exchange data with other device(s) or system(s) in the environment 100 over the one or more networks 101.

External systems 122 may be, for example, one or more third party and/or auxiliary systems that integrate and/or communicate with the server system 102 in performing various CaaS tasks. External systems 122 may be in communication with other device(s) or system(s) in the environment 100 over the one or more networks 101. For example, external systems 122 may communicate with the server system 102 via API (application programming interface) access over the one or more networks 101, and also communicate with the employee devices 116 via web browser access over the one or more networks 101.

As indicated above, FIG. 1 is provided merely as an example. Other examples that differ from the example environment 100 of FIG. 1 are contemplated within the scope of the present embodiments. In addition, the number and arrangement of devices and networks shown in environment 100 are provided as an example. In practice, there may be additional devices, fewer devices and/or networks, different devices and/or networks, or differently arranged devices and/or networks than those shown in environment 100. Furthermore, two or more devices shown in FIG. 1 may be implemented within a single device, or a single device shown in FIG. 1 may be implemented as multiple, distributed devices. Additionally, or alternatively, one or more devices may perform one or more functions of other devices in the example environment 100. For example, employee devices 116 may be configured to perform one or more functions of tenant devices 120, in addition to their own functions.

Figure 2:
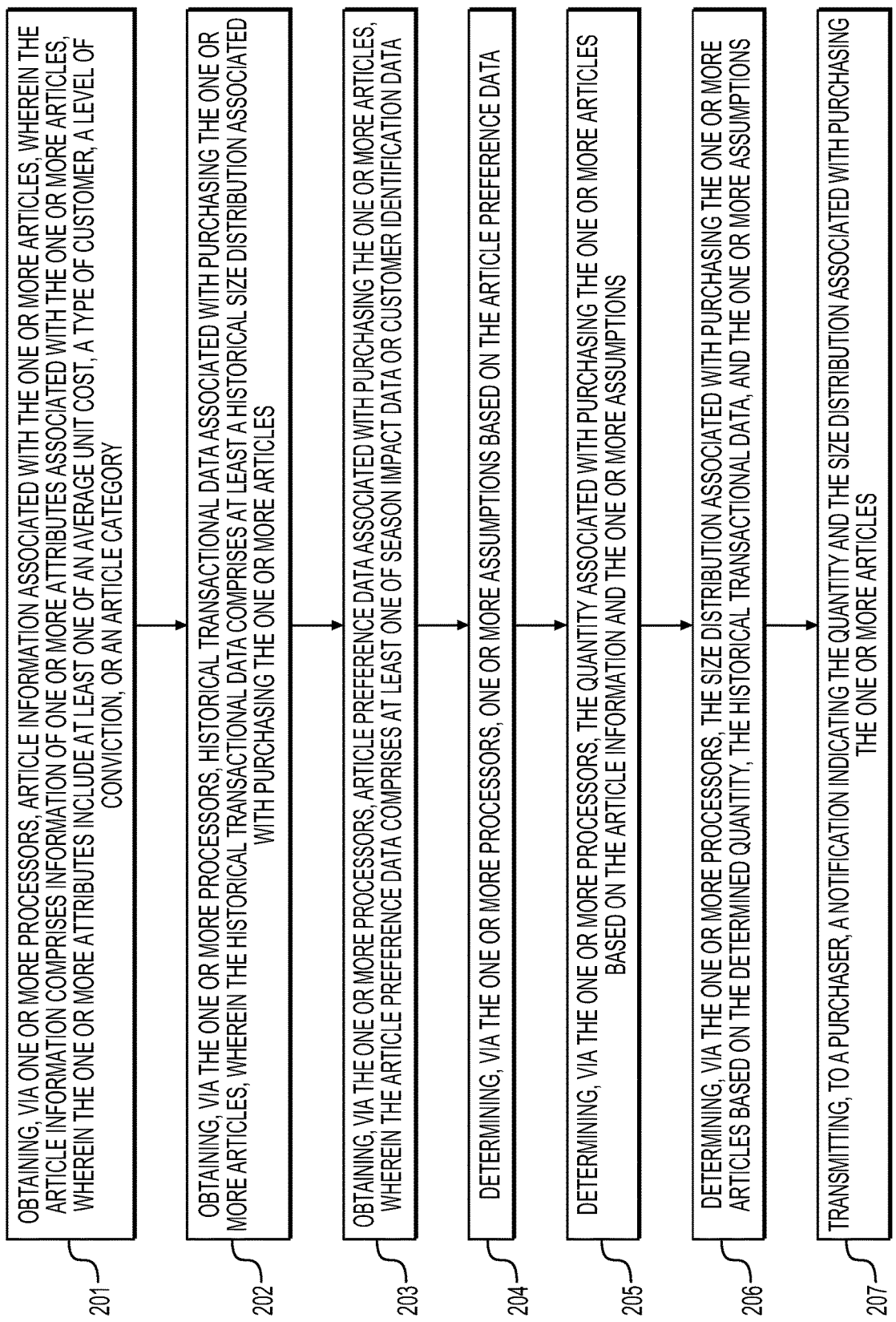
FIG. 2 depicts an exemplary flowchart illustrating a method for determining a quantity and a size distribution associated with purchasing one or more articles, according to one or more embodiments.

FIG. 2 is an exemplary flowchart illustrating a method for determining a quantity and a size distribution associated with purchasing one or more articles. The method may be performed by server system 102.

Step 201 may include obtaining, via one or more processors, article information associated with the one or more articles. The article information may comprise information of one or more attributes associated with the one or more articles. Such article information may be provided by a purchaser via a user interface displayed on an employee device 116. The article information may be determined by one or more algorithms (e.g., an algorithm that randomly defines article information). The one or more attributes may include at least one of an average unit cost, a type of customer, a level of conviction, or an article category. The average unit cost may include the average cost of one or more articles that a purchaser is willing to purchase during a predetermined period of time. The predetermined period of time may be at least one day, one week, one month, one quarter, one year, or longer. The predetermined period of time may be at most one year, one quarter, one month, one week, one day, or less. The average unit cost may fall into at least one or more price groups. The one or more price groups may include a high price group, a middle price group, a low price group, and/or a minimum order quantity price group. One or more assumptions and/or algorithms may be used to determine how the average unit cost of one or more articles falls into one or more price groups. For example, an evening dress may fall into the high price group, a business suit may fall into middle price group, and sportswear may fall into a low price group. The minimum order quantity price group may be associated with any articles that belong to a minimum order quantity category. Details of the minimum order quantity category are described below. In one example, one or more assumptions may include an average unit cost of the high price group equal to about $75.00, an average unit cost of the middle price group equal to about $41.20, an average unit cost of the low price group equal to about $22.00, and an average unit cost of the minimum order quantity price group equal to about $40.50.

The one or more attributes may include a type of customer. The type of customer may include at least one of a core customer or a niche customer. The core customer may represent a majority of the customers of an appeal subscription service. The core customer may prefer the core apparel or article category that are likely to have a broad appeal across the customers of the apparel subscription service. The core customer may show similar article preferences based on a trend or seasonal impact. The niche customer may represent a subgroup, but not a majority, of customers of an appeal subscription service. The niche customer may show different article preference from the core customer based on a trend or seasonal impact. The niche customer may prefer niche apparel or article categories that are likely to resonate with less engaged customers of the apparel subscription services and may not be in line with preferences of the core customers. The one or more attributes may include a level of conviction indicative of a prediction made by the purchaser regarding renting the one or more articles to one or more customers. For example, predictions may show how strongly the purchaser feels about one or more articles (e.g., based on the article categories) according to the purchaser's experience with one or more attributes associated with the one or more articles. For instance, a purchaser having a high level of conviction on sportswear for college students in a future summer season may indicate that the purchaser has experience with high rental volume of sportswear for college students in the summer season last year. The article categories may be divided based on any suitable criteria. In one example, the article categories may include blazer, coat, blouse, jacket, dress, jeans, jumper, pants, sweaters, swimsuit, T-shirt, shirt, suit, underwear, or gown. In another example, the article categories may include dress, pant, blazer, top, cardigan, skirt, or outwear.

The article information may further include data indicative of whether the one or more articles belong to a minimum order quantity category. If a merchant has a contractual relationship with the entity providing the apparel rental subscription service, the purchaser may purchase articles from the merchant based on a predetermined quantity (e.g., a minimum quantity) for a certain article category. This article category may therefore belong to a minimum order quantity category. In this situation, the quantity of purchasing for the certain article category may be fixed, while the size distribution of purchasing the certain article category may be variant. To determine the size distribution, historical transactional data, such as historically predetermined quantity for at certain article category, may be used.

As described herein, a merchant may be an entity that provides products. In this disclosure, the term "product," in the context of products offered by a merchant, encompasses both goods and services, as well as products that are a combination of goods and services. In some embodiments, the product may include one or more articles.

The article information may further include data indicative of whether the one or more articles belong to a pre-pack category. If a merchant has a contractual relationship with the entity providing the apparel subscription service such that a purchaser cannot purchase a certain article category with flexibility in size distribution but can only purchase the certain article category with size distribution in a predetermined ratio, the certain article category may belong to a pre-pack category. For example, the predetermined ratio may include a ratio of size XS:size S:size M:size L equal to 1:1:1:1. A merchant who sells articles belonging to minimum order quantity category or pre-pack category may not go through the whole method of determining a quantity and size distribution, since a quantity or size distribution may be determined based on a contractual relationship. For example, a merchant who sells articles belonging to minimum order quantity category may have a fixed quantity determined by a contractual relationship, but the size distribution can be changed. In another example, a merchant who sells articles belonging to pre-pack category may have a fixed size distribution determined by a contractual relationship, but the quantity (e.g., number of packs) can be changed. Historical transactional data (e.g., historical quantity and size distribution) may be used to determine the pre-determined quantity and/or size distribution of articles belonging to a minimum order quantity category or pre-pack category.

The one or more attributes may include additional information relating to the one or more articles, including, but not limited to, the brand of the one or more articles, the marketing strategy of promoting the one or more articles, the cost of manufacturing the one or more articles, whether or not the one or more articles are associated with (e.g., presented on) other apparel rental subscription services or other entities providing the apparel rental subscription services, or the packing method associated with the one or more articles. The number of attributes used for the method disclosed herein may be at least 1, 2, 3, 4, or more. The number of attributes may be at least 5, 4, 3, 2, or less. The number of attributes may be less than five. Since the number of one or more attributes may have a maximum value, the criteria to select the one or more attributes may include the purchaser's ability to obtain information for a given attribute (e.g., whether the purchaser can obtain information quickly and efficiently), addressable customer and article popularity, the impact of a given attribute on average unit cost, ability to validate values of each attribute, and/or ability to validate values of each attribute throughout a predetermined period of time (e.g., a season). For each criterion, a value or description may be assigned for each attributes.

Table 1 shows an example of values assigned to various criteria with different attributes. Table 1 may be used to determine which attributes may be included in determining a quantity based on how much these attributes impact the goals or targets set by the purchasers (e.g., meeting cost and unit targets, or matching the quantity of one article category to how popular such article category may be). In Table 1, "H" means the value is high, "M" means the value is in the middle, and "L" means the value is low. For example, for average unit cost, the purchaser may be able to obtain information quickly and efficiently (high value), the addressable customer and article popularity may be low (low value), the impact of a given attribute on average unit cost may be high (high value), the ability to validate values of each attribute may be high (high value), and the ability to validate values of each attribute throughout a season may be high (high value).

TABLE 1

| Attribute | Ease of obtaining attribute | Addressable audience/ popularity | Impact to AUC | Ability to validate (build) | Ability to validate (buy season) |
|---|---|---|---|---|---|
| Average Unit Cost | H | L | H | H | H |
| Type of Customer | M | H | L | M | L |
| Level of Conviction | M | H | L | M | L |
| Article Category | H | M | L | H | H |

Step 202 may include obtaining, via the one or more processors, historical transactional data associated with purchasing the one or more articles. The historical transactional data may include at least a historical size distribution associated with purchasing the one or more articles. The historical size distribution may include any information regarding sizes of one or more previously purchased articles (e.g., article(s) purchased last year by a purchaser). The historical transactional data may include any suitable information regarding a transaction associated with purchasing or renting one or more articles, for example, a purchaser identifier, contact information (e.g., address, phone numbers, e-mail addresses, etc.), demographic information of the purchaser or the customer (e.g., age, gender, marital status, income level, educational background, number of children in household, etc.), purchaser preferences (preferences or reviews regarding favorite products and/or services, favorite department stores/brands, etc.), a transaction amount, and previous transaction information. The previous transaction information may include a time of a prior transaction, spending profile, past spending levels on goods, a frequency of shopping, how much the purchaser spends in an average transaction, or how much to spend on a particular product. The historical transactional data may be obtained via one or more employee devices 116, and may be stored in one or more databases associated with the entity providing the apparel subscription services (e.g., databases 106). The historical transactional data (e.g., a historical size distribution) may be adjusted or overridden based on changes that are anticipated (e.g., the demand of sizes 10-16 may increase in 3 months). In some embodiments, the historical size distribution may be adjusted based on the one or more assumptions described herein. The historical transactional data (e.g., historical demand of an article category) may be computed along several different size scales based on production capacity of merchants (e.g., a merchant may produce sizes between 0 and 32, while others may produce sizes between 6 and 24). The historical transactional data may include historical rental demand metrics. The historical rental demand metrics may include any information regarding actual rental usage or an interested/demand expressed by purchasers, customers, or users. In one example, a given article may be chosen by many customers or users of the apparel rental subscription services, but these customers or users may not actually receive the given article (e.g., if demand for the article exceeds supply). In this situation, a similar article, not the given (chosen) article, may be purchased, to meet the expressed interest/demand in the future.

Step 203 may include obtaining, via the one or more processors, article preference data associated with purchasing the one or more articles. The article preference data may include at least one of season impact data or customer identification data. The season impact data may indicate seasonal impact on a trend or customer preference(s) for purchasing the one or more articles. For instance, during the winter season, outerwear and sweaters may be more preferable than T-shirt or short pants. The customer identification data may include any information regarding a customer's identity, including, for example, a customer name, a customer address, or a customer income range. The customer identification data also may include biometric data of the customer or any information related to behavioral characteristics related to the pattern of behavior of the user. The customer identification data may further include any information pertaining to the customer, including, demographic information (e.g., age, gender, marital status, income level, educational background, number of children in household, etc.), employment, and other data related to the customer.

Step 204 may include determining, via the one or more processors, one or more assumptions based on the article preference data. The one or more assumptions may include one or more numerical values associated with the one or more article attributes. The one or more assumptions may be updated periodically. For example, the one or more assumptions may be updated or evaluated at the start of each season, based on the one or more assumptions from the prior year (e.g., using one or more assumptions used in spring of a first year for calculating one or more assumptions of spring of the following year and a quantity and a size distribution of spring of the following year). One or more attributes and assumptions within the calculator may be evaluated each season, for example. Over time, the one or more attributes that are used to determine quantities by article category may be shifted, as business strategies and trends change. The one or more assumptions associated with the one or more attributes may change frequently, reflecting both seasonal impact (e.g., an assumption associated with a dress in summer may be different from such assumption in winter). These changes of the one or more assumptions may be made at the outset of a new season, though, if desired, may be changed mid-season (e.g., to address topline business shifts). For example, if the anticipated number of customers of the apparel subscription services increases, the one or more assumptions may be adjusted and the quantity of the one or more articles may increase to ensure enough inventory for all the customers. The changes to one or more assumptions may be implemented in such a way that previously-purchased styles with older assumptions, as well as remaining styles to purchase with newer assumptions, may together satisfy an increase in the total desired quantities for the season. Topline targets may include a purchasing plan (e.g., number of article categories to purchase, number of unique item identifier (e.g., stock keeping unit) to purchase, average quantity, average unit cost), as well as a targeted distribution of article categories across various one or more attributes. These targets may be established prior to purchasing articles for an upcoming season and may be based on projected customer number for the apparel rental subscription service(s), historical purchaser performance, and/or product performance. The topline targets may either determined by individuals (e.g., employees of an entity providing the apparel rental subscription services) or by one or more algorithms. The topline targets can be changed whenever required, e.g., at the beginning of a season or mid-season.

Step 205 may include determining, via the one or more processors, the quantity associated with purchasing the one or more articles based on the article information and the one or more assumptions. One or more algorithms may be used to determine the quantity associated with purchasing the one or more articles. For instance, one algorithm may calculate the quantity associated with purchasing the one or more articles based on a matrix (e.g., a matrix associated with average unit cost and a type of customer), the level of conviction, and the article category. In one example, the quantity may be determined by multiplying values assigned to the matrix, the level of conviction, and the article category, respectively. The algorithm may work based on an indexing system. For example, one or more attributes may either be increased (index is greater than 1.0) or decreased (index is less than 1.0) from the average for each attribute selected by the purchaser.

Figure 3:
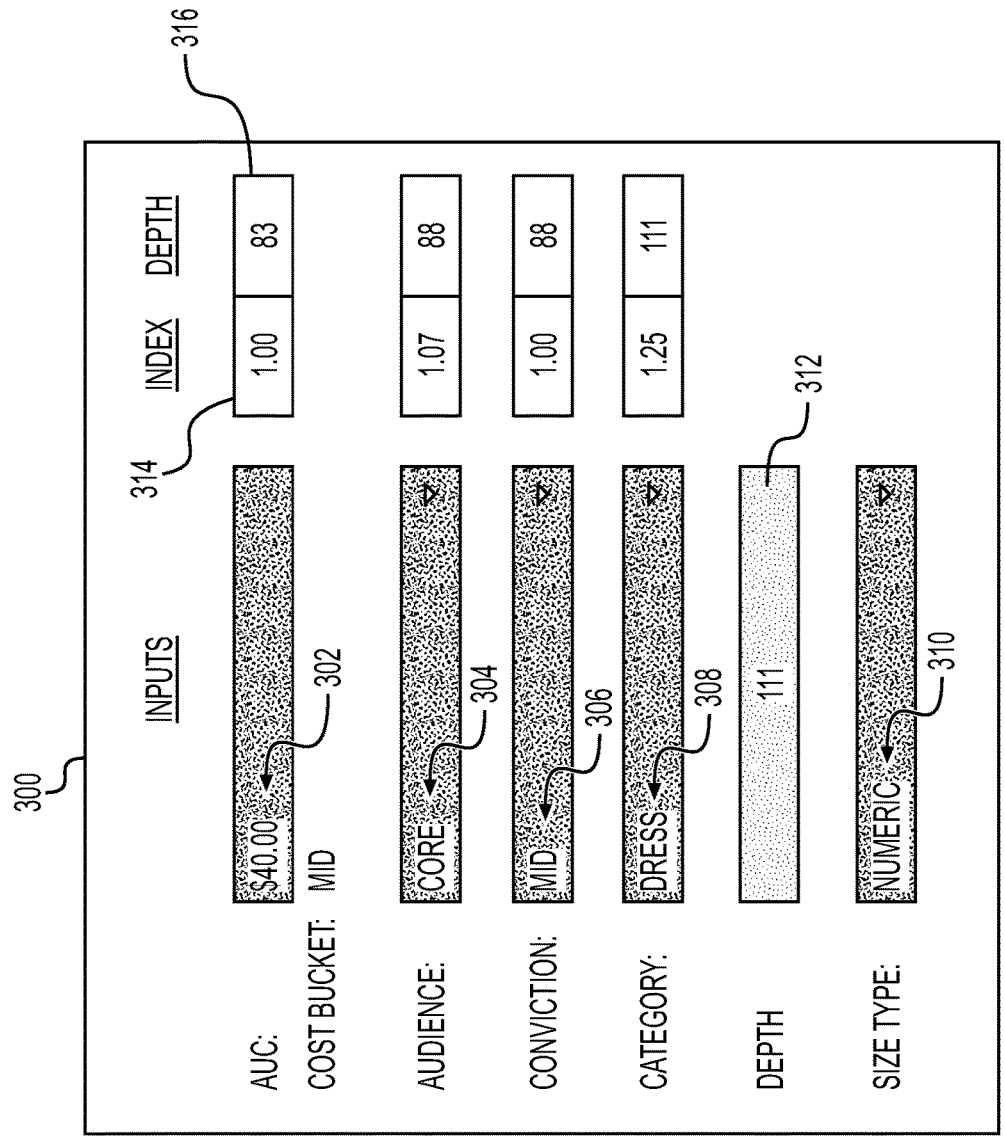
FIG. 3 depicts an exemplary user interface presented on an employee device for a purchaser showing a quantity associated with purchasing one or more articles, according to one or more embodiments of the present disclosure.

FIG. 3 depicts an exemplary user interface presented on an employee device 116 for a purchaser employee 114 showing a quantity associated with purchasing one or more articles, according to one or more embodiments of the present disclosure. In this example, the employee device 116 may be a laptop, desktop, mobile phone, tablet computer, etc., executing a display of, e.g., a website 300. The website 300 may be displayed to the purchaser after a login status of the purchaser is determined and the purchaser is able to access the purchaser account based on the login status. In other embodiments, the information illustrated in FIG. 3 may be presented in a different format via software executed on an electronic device (e.g., a desktop, mobile phone, or tablet computer) serving as the employee device 116.

The website 300 may include one or more graphical elements. The one or more graphical elements may include, but are not limited to, input controls (e.g., checkboxes, radio buttons, dropdown lists, list boxes, buttons, toggles, text fields, date field), navigational components (e.g., breadcrumb, slider, search field, pagination, slider, tags, icons), informational components (e.g., tooltips, icons, progress bar, notifications, message boxes, modal windows), or containers (e.g., accordion). As shown in FIG. 3, one or more graphical elements 302-312 may enable a purchase to enter or select average unit cost 302, a type of customer (e.g., audience) 304, a level of conviction 306, an article category 308, and a size class 310 (e.g., an alphabetical or alpha size class, or a numeric size class). The one or more graphical elements may also provide information regarding a quantity (e.g., depth) associated with purchasing one or more articles 312.

Regarding the average cost unit 302, after a purchaser types or otherwise specifies or selects the average unit cost 302, each article category may automatically be categorized into different prices groups, such as the high price group, middle price group, or low price group. In the example illustrated in FIG. 3, all mid cost styles may be bought at 83 units. In another example, all high cost styles may be bought at 27 units. The dropdown list 304 may enable a purchaser to select whether the customer is a niche customer or a core customer, as described herein. The dropdown list 306 may enable a purchaser to select a level of conviction (e.g., high, middle, low). The level of conviction may indicate, for example, an article category that the purchaser feels strongly to increase in quantity in the future. The dropdown list 308 may enable a purchaser to select an article category. Once the quantity associated with purchasing one or more articles is determined, the dropdown list 310 may enable a purchaser to select a size class in order to view the quantity associated with purchasing one or more articles. In some embodiments, purchasers may use predetermined values for a type of customer and a level of conviction to ensure average quantity in line with plan targets. One or more attributes may be changed slightly throughout the season pending mid-season rollups. For articles belonging to minimum order quantity category and pre-pack category, the purchaser may not enter anything but accept a pre-determined quantity and size distribution, respectively. One or more assumptions 314 and relevant quantities 316 may be shown in the website 300.

Referring back to FIG. 2, step 206 may include determining, via the one or more processors, the size distribution associated with purchasing the one or more articles based on the determined quantity, the historical transactional data, and the one or more assumptions. The method may be performed in such a way that regardless of the determined quantity, the size distribution may match exactly. In the event that the quantity is calculated as a non-whole number (e.g., a decimal), one or more overrides may be used to ensure that the sum of the sizes recommended is not more or less than the quantity recommended to purchase, which may be important for article category bought at lower quantity. The determined quantity by size for the season may be in line with the demand by season. The size distribution may indicate how the determined quantity distributes among one or more sizes of an article category.

FIG. 4 depicts an exemplary user interface presented on an employee device for a purchaser showing a size distribution associated with purchasing one or more articles, according to one or more embodiments of the present disclosure. In this example, the employee device 116 may be a laptop, desktop, mobile phone, tablet computer, etc. executing a display of, e.g., a website 400. The website 400 may display historical account data to the purchaser after a login status of the purchaser is determined and the purchaser is able to access the purchaser account based on the login status. Additionally or alternatively, the information illustrated in FIG. 4 may be presented in a different format via software executing on an electronic device (e.g., a desktop, mobile phone, or tablet computer) serving as the employee device 116.

The website 400 may be shown to the purchaser after the quantity associated with the purchasing one or more articles is determined. In the example shown in FIGS. 3 and 4, the quantity is 111. In the website 400, four different results 402-408 of size distribution associated with purchasing one or more articles may be shown. Different merchants may produce articles in different sizes. The four different results 402-408 may represent four common sizes combinations. In some embodiments, there may be other sizes combinations. The first result 402 may show the size distribution of 111 articles among sizes 0, 2, 4, 6, 8, 10, 12, 14, 16, 14W, 16W, 18W, 20W, 22W, 24W, 26W, 28W, 30W, and 32W. The second result 404 may show the size distribution of 111 articles among sizes 6, 8, 10, 12, 14, 16, 14W, 16W, 18W, 20W, 22W, and 24W. The third result 406 may show the size distribution of 111 articles among sizes 4, 6, 8, 10, 12, 14, 16, 14W, 16W, 18W, 20W, 22W, and 24W. The fourth result 408 may show the size distribution of 111 articles among sizes 0, 2, 4, 6, 8, 10, 12, 14, 16, 14W, 16W, 18W, 20W, 22W, 24W, and 26W.

Referring back to FIG. 4, step 207 may include transmitting, to a purchaser, a notification indicating the quantity and the size distribution associated with purchasing the one or more articles. The notification may include any information about the quantity and the size distribution associated with purchasing the one or more articles. The notification may be configured to be displayed on a display screen of a user device, an employee device, or a tenant device. The notification may be displayed on the display screen in any suitable form, such as an e-mail, a text message, a push notification, content on a web page, and/or any form of graphical user interface. The user device, employee device, or tenant device may be capable of accepting inputs of a user, an employee, or a tenant via one or more interactive components of the user device, the employee device, or the tenant device, such as a keyboard, button, mouse, touchscreen, touchpad, joystick, trackball, camera, microphone, or motion sensor. The method may further include, prior to transmitting the notification to the purchaser, obtaining a size class associated with an article category. The size class may be obtained via one or more inputs from the purchaser (e.g., a purchaser selects a from a dropdown list associated with the size class). The size class may include at least one of an alpha size class (e.g., XL, XLL) or a numerical size class (e.g., 0, 2, 4).

The method may further include providing one or more rules for determining the quantity and size distribution associated with purchasing one or more articles. The one or more rules may include if article belongs to minimum order quantity category or pre-pack category, referring to pre-determined quantity and size distribution; if the article category is in high price group, the article category may be labeled as low level of conviction (e.g., purchasing 27 unit); certain brands of articles may have pre-determined or specifically-assigned values as these brands may deviate significantly from the preference of core customers and/or niche customers; articles that come in a different sizes may still align with the total units based on the article category, average unit cost, type of customer and level of conviction; or for certain article categories or brands (e.g., plus and missy articles), average unit cost may be determined differently (e.g., smaller units may be selected to determine the average unit cost).

Figure 5:
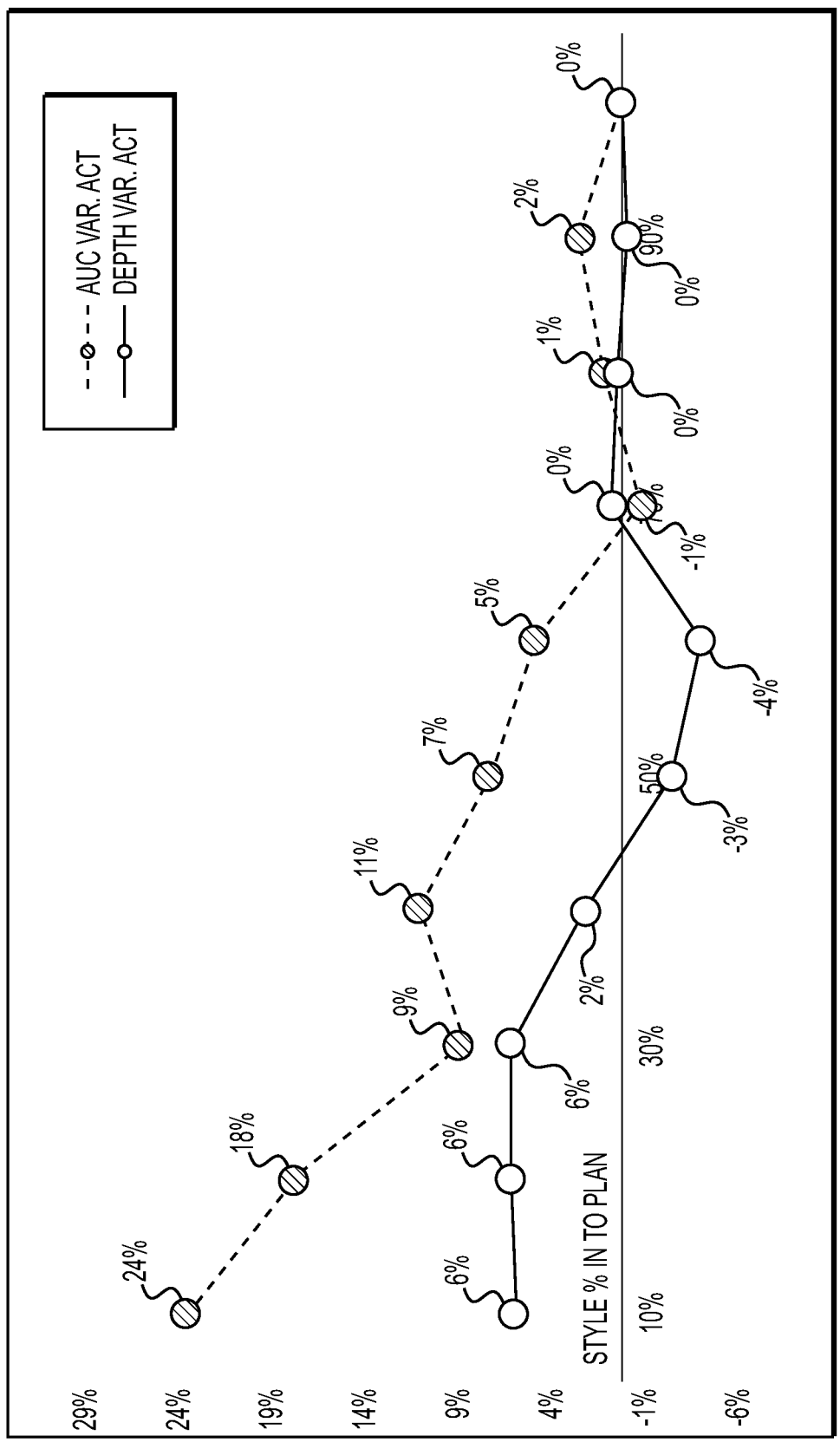
FIG. 5 depicts an exemplary chart illustrating average unit cost and quantity tolerance.
Figure 6:
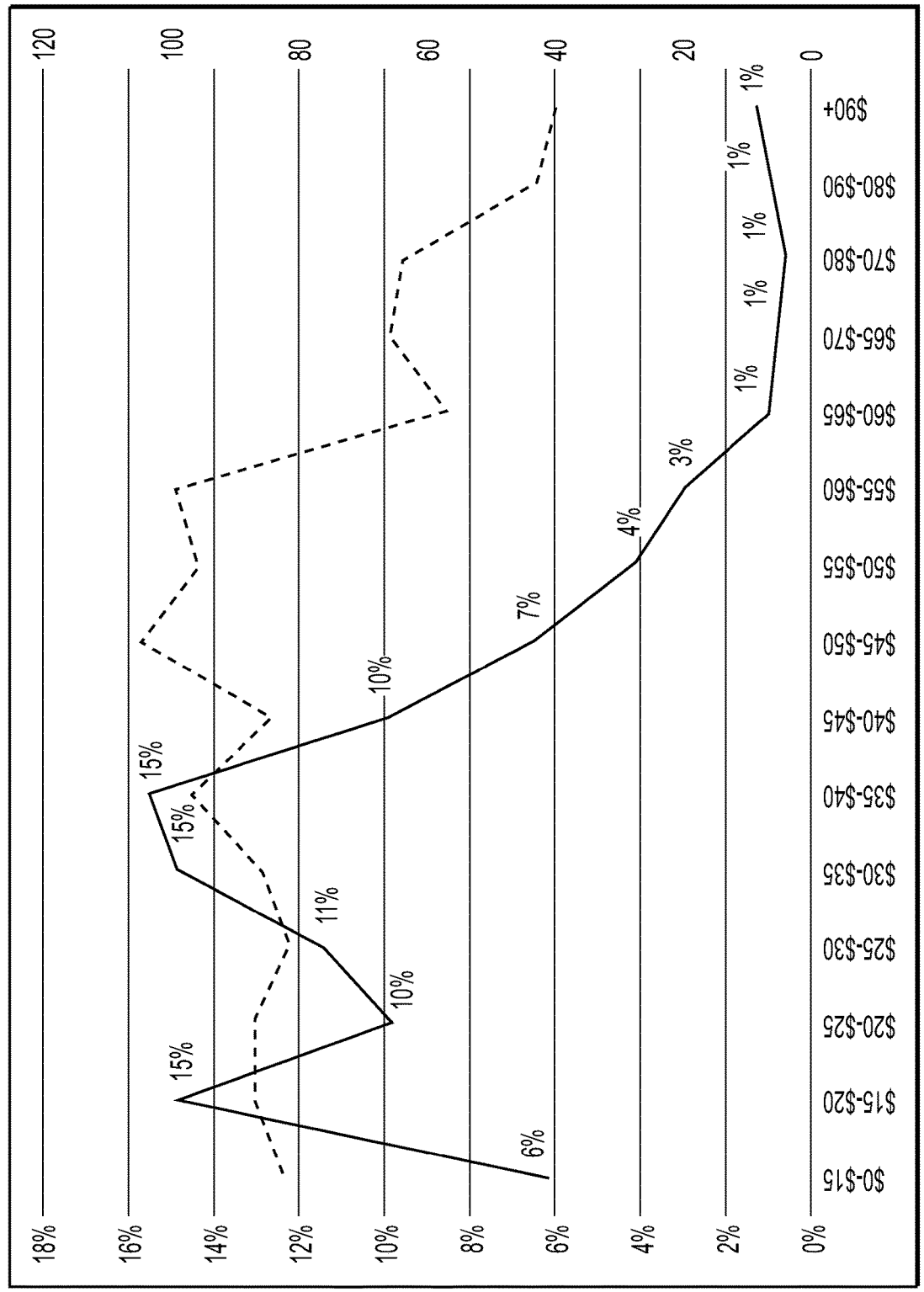
FIG. 6 depicts an exemplary chart illustrating average unit cost purchased for different price groups.

FIG. 5 depicts an exemplary chart illustrating average unit cost ("AUC") and quantity tolerance in an exemplary season. The exemplary season may be a purchase period when one or more purchases purchase multiple times during the purchase period. The quantity tolerance may include any information regarding the deviation of quantity or average unit cost from the targets set by the purchaser. As shown in FIG. 5, for most of the style % into the plan, the average unit cost tolerance ("AUC VAR. ACT") is higher than the quantity tolerance ("DEPTH VAR. ACT"). FIG. 6 depicts an exemplary chart illustrating average unit cost purchased for different price groups. As shown in FIG. 6, the average unit cost changes for different price groups. FIG. 5 and FIG. 6 may provide information to understand how average unit cost and determined quantity has historically evolved during a period of time (e.g., a season). Since purchasers may purchase multiple times for a given season (e.g., a purchase period) over the length of the given season, and it may be difficult to determine the time until the final article category is purchased, it may be beneficial to have tolerances such that, with the remaining article categories left to purchase, the seasonal targets can still be met. For example, article categories to be purchased at the beginning of a purchase period may be more expensive than those at the end of the purchase period, so it may be beneficial to know what such trend typically looks like to develop tolerance and make reasonable decisions. In one example, when 10% of article categories are purchased, the tolerance may include that the average unit costs may be 20% higher than the targets set by the purchasers because the average unit costs may decrease during the purchase period based on historical data. FIGS. 5 and 6 provide examples of historical data may be useful during a purchase period to determine the tolerances based on how far into the total article category count the purchaser have bought.

At any stage of determining a quantity and a size distribution associated with purchasing one or more articles, the method may further include storing data (e.g., article information, a quantity, a size distribution) for subsequent analysis. The stored data may have an expiration period. The expiration period may be at least 1 day, 1 week, 1 month, 1 quarter, 1 year or longer. In other embodiments, the expiration period may be at most 1 year, 1 quarter, 1 month, 1 week, 1 day or shorter. The subsequent analysis may include analyzing the data to update the quantity and size distribution associated with purchasing one or more articles, article information, historical transactional data, or article preference data.

A machine learning model may be used to determine a quantity and a size distribution associated with purchasing one or more articles. The machine learning model may be a regression-based model or classification model that accepts the data identified in any steps described above as input data. Regression models may predict a number (e.g., a quantity of 111). The machine learning model may be of any suitable form, and may include, for example, a neural network, linear regression, logistic regression, support vector machines (SVM), naïve Bayes classifiers, or may include tree-based methods such as random forest or gradient boosting machines (GBM). A neural network may be software representing human neural system (e.g., cognitive system). A neural network may include a series of layers termed "neurons" or "nodes." A neural network may include an input layer, to which data is presented; one or more internal layers; and an output layer. The number of neurons in each layer may be related to the complexity of a problem to be solved. Input neurons may receive data being presented and then transmit the data to the first internal layer through connections' weight. A neural network may include a convolutional neural network, a deep neural network, or a recurrent neural network.

The machine learning model may produce the quantity and a size distribution associated with purchasing one or more articles as a function of the article information, the historical transactional data, the article preference data, the one or more assumptions, or one or more variables indicated in the input data. The one or more variables may be derived from the article information, the historical transactional data, the article preference data, or the one or more assumptions. This function may be learned by training the machine learning model with training sets. The machine learning model may be trained by supervised, unsupervised, or semi-supervised learning using training sets comprising data of types similar to the type of data used as the model input. For example, the training set used to train the model may include any combination of the following: the article information, the historical transactional data, the article preference data, or the one or more assumptions. Accordingly, the machine learning model may be trained to map input variables to a quantity or value of the quantity and a size distribution associated with purchasing one or more articles. The quantity and a size distribution associated with purchasing one or more articles determined by the machine learning model may be used as an additional input variable.

In general, any process discussed in this disclosure that is understood to be computer-implementable, such as the processes illustrated in FIG. 2, may be performed by one or more processors of a computer system or a server system 102, as described above. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable types of processing unit.

A computer system, such as a server system 112, may include one or more computing devices. If the one or more processors of the server system 112 are implemented as a plurality of processors, the plurality of processors may be included in a single computing device or distributed among a plurality of computing devices. If a server system 112 includes a plurality of computing devices, the memory of the server system 112 may include the respective memory of each computing device of the plurality of computing devices.

Figure 7:
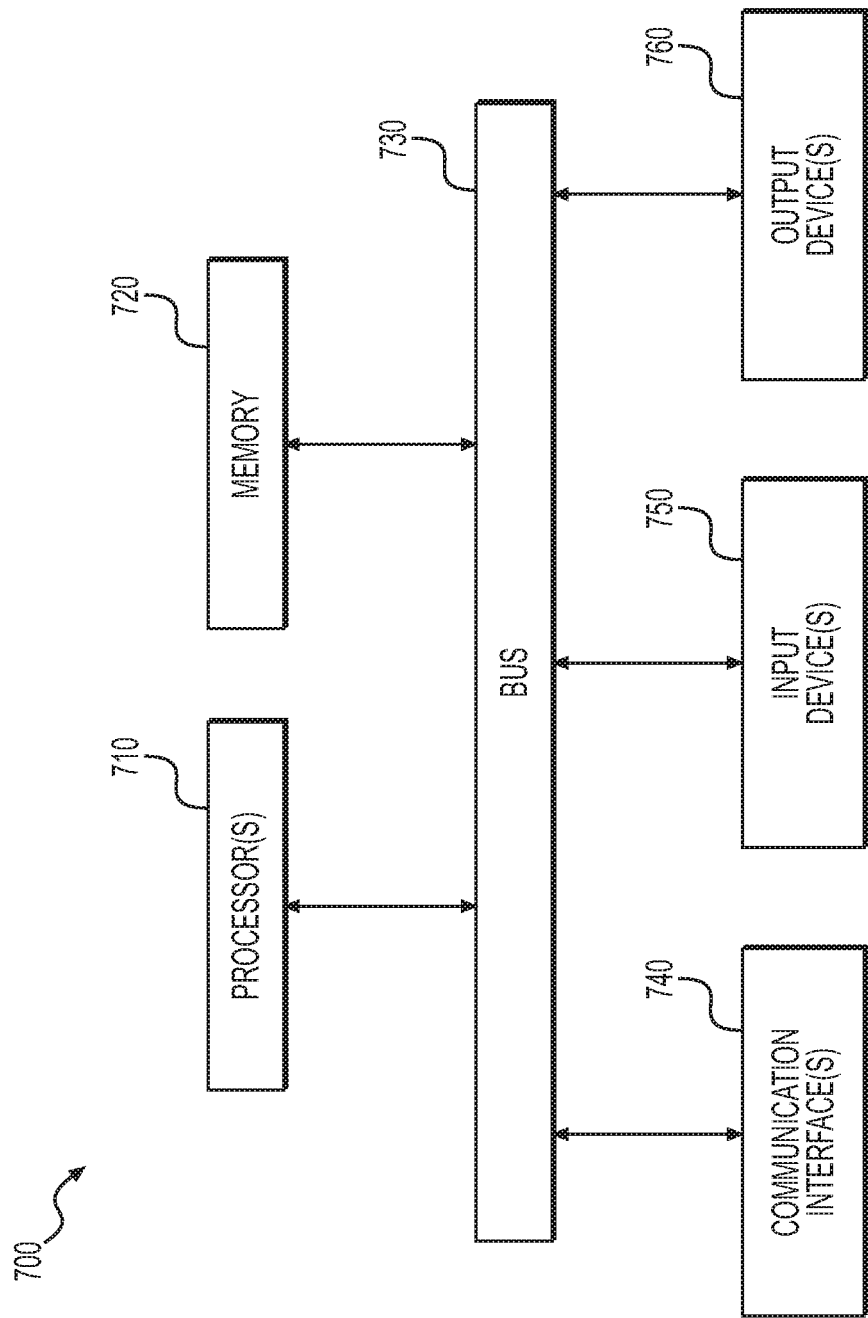
FIG. 7 illustrates an example of a computing device 700 of a computer system.

FIG. 7 illustrates an example of a computing device 700 of a computer system. The computing device 700 may include processor(s) 710 (e.g., CPU, GPU, or other such processing unit(s)), a memory 720, and communication interface(s) 740 (e.g., a network interface) to communicate with other devices. Memory 720 may include volatile memory, such as RAM, and/or non-volatile memory, such as ROM and storage media. Examples of storage media include solid-state storage media (e.g., solid state drives and/or removable flash memory), optical storage media (e.g., optical discs), and/or magnetic storage media (e.g., hard disk drives). The aforementioned instructions (e.g., software or computer-readable code) may be stored in any volatile and/or non-volatile memory component of memory 720. The computing device 700 may, in some embodiments, further include input device(s) 750 (e.g., a keyboard, mouse, or touchscreen) and output device(s) 760 (e.g., a display, printer). The aforementioned elements of the computing device 700 may be connected to one another through a bus 730, which represents one or more busses. In some embodiments, the processor(s) 710 of the computing device 700 includes both a CPU and a GPU.

Instructions executable by one or more processors may be stored on a non-transitory computer-readable medium. Therefore, whenever a computer-implemented method is described in this disclosure, this disclosure shall also be understood as describing a non-transitory computer-readable medium storing instructions that, when executed by one or more processors, cause the one or more processors to perform the computer-implemented method. Examples of non-transitory computer-readable medium include RAM, ROM, solid-state storage media (e.g., solid state drives), optical storage media (e.g., optical discs), and magnetic storage media (e.g., hard disk drives). A non-transitory computer-readable medium may be part of the memory of a computer system or separate from any computer system.

It should be appreciated that in the above description of exemplary embodiments, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claims require more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this disclosure.

Furthermore, while some embodiments described herein include some but not other features included in other embodiments, combinations of features of different embodiments are meant to be within the scope of the disclosure, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the disclosure, and it is intended to claim all such changes and modifications as falling within the scope of the disclosure. For example, functionality may be added or deleted from the block diagrams and operations may be interchanged among functional blocks. Steps may be added or deleted to methods described within the scope of the present disclosure.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted.

What is claimed is:

1. A computer-implemented method for determining a recommended quantity and a size distribution associated with one or more articles, the method comprising:
    obtaining, via one or more processors, article information associated with the one or more articles, wherein the article information comprises one or more attributes including a prediction of a likelihood of the one or more articles of an article category being requested by one or more service users, the prediction being received by a service operator interaction with a graphical element;
    obtaining, via the one or more processors, historical transactional data from at least one database, the historical transactional data comprising previous transaction data, at least one historical rental demand metric, and a historical size distribution associated with the one or more articles;
    obtaining, via the one or more processors, article preference data comprising at least one of season impact data and service user identification data for the one or more articles;
    determining, via the one or more processors, one or more assumptions of demand for the one or more articles based on the article preference data;
    training, via the one or more processors, a machine learning model to map input variables to the recommended quantity associated with the one or more articles, the recommended quantity being indicative of a number of articles to be made available through an electronic platform, the input variables including the one or more attributes including the prediction of the likelihood of the one or more articles of the article category being requested;
    executing the machine learning model to determine, via the one or more processors, the recommended quantity associated with the one or more articles based on the article information and the one or more assumptions, wherein the machine learning model was trained with the at least one training set to determine the recommended quantity;
    executing the machine learning model to determine, via the one or more processors, the size distribution associated with the one or more articles based on the recommended quantity, the historical transactional data, and the one or more assumptions, wherein the machine learning model was trained with the at least one training set to determine the size distribution;
    subsequently training the machine learning model using the size distribution associated with the one or more articles based on the recommended quantity, the historical transactional data, and the one or more assumptions; and
    in accordance with the subsequently training, displaying, to the service operator, a notification indicating the recommended quantity and the size distribution associated with the one or more articles.

2. The computer-implemented method of claim 1, wherein the one or more attributes include an average unit cost that falls into at least one of one or more price groups.

3. The computer-implemented method of claim 1, wherein the one or more attributes include a type of service user, the type of service user including a niche service user group that represents a minority of service users.

4. The computer-implemented method of claim 1, wherein the graphical element is configured to allow the service operator to select and change the prediction, and wherein the model is configured to change the size distribution associated with the one or more articles in response to a change in the prediction.

5. The computer-implemented method of claim 1, wherein the article information further comprises whether the one or more articles belong to a minimum order quantity category.

6. The computer-implemented method of claim 1, wherein the article information further comprises whether the one or more articles belong to a pre-pack category.

7. The computer-implemented method of claim 1, wherein the one or more assumptions include one or more numerical values associated with the one or more article attributes.

8. The computer-implemented method of claim 1, wherein a number of the one or more attributes is less than five.

9. The computer-implemented method of claim 1, wherein the size distribution indicates how the determined quantity distributes among one or more sizes of an article category.

10. The computer-implemented method of claim 1, wherein the model is configured to adjust the size distribution based on the one or more assumptions.

11. The computer-implemented method of claim 1, wherein the one or more assumptions are updated periodically.

12. The computer-implemented method of claim 1, wherein the article preference data comprises the season impact data that indicates seasonal impact on a trend or service user preference for the one or more articles.

13. A computer system for determining a recommended quantity and a size distribution associated with one or more articles, comprising:
   a memory storing instructions; and
   one or more processors configured to execute the instructions to perform operations including:
      obtaining, via the one or more processors, article information associated with the one or more articles, wherein the article information comprises one or more attributes including a prediction of a likelihood of the one or more articles of an article category being requested by one or more service users, the prediction being received by a service operator interaction with a graphical element;
      obtaining, via the one or more processors, historical transactional data from at least one database, the historical transactional data comprising previous transaction data, at least one historical rental demand metric, and at least a historical size distribution associated with the one or more articles;
      obtaining, via the one or more processors, article preference data comprising at least one of season impact data and service user identification data of the one or more articles;
      determining, via the one or more processors, one or more assumptions of demand for the one or more articles based on the article preference data;
      training, via the one or more processors, a machine learning model to map input variables to the recommended quantity associated with the one or more articles, the recommended quantity being indicative of a number of articles to be made available through an electronic platform, the input variables including the one or more attributes including the prediction of the likelihood of the one or more articles of the article category being requested;
      executing the machine learning model to determine, via the one or more processors, the recommended quantity associated with the one or more articles based on the article information and the one or more assumptions, wherein the machine learning model was trained with the at least one training set to determine the recommended quantity;
      executing the machine learning model to determine, via the one or more processors, the size distribution associated with the one or more articles based on the recommended quantity, the historical transactional data, and the one or more assumptions, wherein the machine learning model was trained with the at least one training set to determine the size distribution;
      subsequently training the machine learning model using the size distribution associated with the one or more articles based on the recommended quantity, the historical transactional data, and the one or more assumptions; and
      in accordance with the subsequently training, displaying, to the service operator, a notification indicating the recommended quantity and the size distribution associated with the one or more articles.

14. The computer system of claim 13, wherein the article information further comprises whether the one or more articles belong to a minimum order quantity category.

15. The computer system of claim 13, wherein the article information further comprises whether the one or more articles belong to a pre-pack category.

16. The computer system of claim 13, wherein the one or more assumptions include one or more numerical values associated with the one or more article attributes.

17. A non-transitory computer readable medium for use on a computer system containing computer-executable programming instructions for performing a method of determining a recommended quantity and a size distribution associated with one or more articles, the method comprising:
   obtaining, via one or more processors, article information associated with the one or more articles, wherein the article information comprises one or more attributes including one of a prediction of a likelihood of the one or more articles of an article category being requested by one or more service users, the prediction being received by a service operator interaction with a graphical element;
   obtaining, via the one or more processors, historical transactional data from at least one database, the historical transactional data comprising previous transaction data, at least one historical rental demand metric, and a historical size distribution associated with the one or more articles;
   obtaining, via the one or more processors, article preference data comprising at least one of season impact data and service user identification data of the one or more articles;
   determining, via the one or more processors, one or more assumptions of demand for the one or more articles based on the article preference data;
   training, via the one or more processors, a machine learning model to map input variables to the recommended quantity associated with the one or more articles, the recommended quantity being indicative of a number of articles to be made available through an electronic platform, the input variables including the one or more attributes including the prediction of the likelihood of the one or more articles of the article category being requested;
   executing the machine learning model to determine, via the one or more processors, the recommended quantity associated with the one or more articles based on the article information and the one or more assumptions, wherein the machine learning model was trained with the at least one training set to determine the recommended quantity;
   executing the machine learning model to determine, via the one or more processors, the size distribution associated with the one or more articles based on the recommended quantity, the historical transactional data, and the one or more assumptions, wherein the machine learning model was trained with the at least one training set to determine the size distribution;
   subsequently training the machine learning model using the size distribution associated with the one or more articles based on the recommended quantity, the historical transactional data, and the one or more assumptions; and
   in accordance with the subsequently training, displaying, to the service operator, a notification indicating the recommended quantity and the size distribution associated with the one or more articles.

18. The non-transitory computer readable medium of claim 17, wherein the article information further comprises whether the one or more articles belong to a minimum order quantity category.

19. The non-transitory computer readable medium of claim 17, wherein the article information further comprises whether the one or more articles belong to a pre-pack category.

20. The computer-implemented method of claim 1, wherein the model is an updateable model that, when provided updated input variables including updated historical transaction data, is configured to determine an updated quantity, the updateable model being a machine learning model that includes one or more neural networks trained with one or more training sets comprising data corresponding to the one or more assumptions, including an average cost associated with a subset of the one or more articles.

* * * * *